United States Patent
Lupke et al.

(10) Patent No.: US 7,264,457 B2
(45) Date of Patent: Sep. 4, 2007

(54) FLOW DISTRIBUTOR FOR DIE TOOLING OF PIPE MOLD EQUIPMENT WITH REMOTE EXTRUDER

(76) Inventors: Manfred A. A. Lupke, 92 Elgin Street, Thornhill, Ontario (CA) L3T 1W6; Stefan A. Lupke, 32 Vintage Lane, Thornhill, Ontario (CA) L3T 1X6

( * ) Notice: Subject to any disclaimer, the term of this patent is extended or adjusted under 35 U.S.C. 154(b) by 0 days.

(21) Appl. No.: 10/541,488

(22) PCT Filed: Dec. 19, 2003

(86) PCT No.: PCT/CA03/01957

§ 371 (c)(1),
(2), (4) Date: Jul. 7, 2005

(87) PCT Pub. No.: WO2004/062884

PCT Pub. Date: Jul. 29, 2004

(65) Prior Publication Data
US 2006/0051443 A1    Mar. 9, 2006

(30) Foreign Application Priority Data
Jan. 10, 2003    (CA) ................................. 2416083
Feb. 21, 2003    (CA) ................................. 2419703

(51) Int. Cl.
*B29C 47/06*    (2006.01)
*B29C 47/26*    (2006.01)
*B29C 47/92*    (2006.01)

(52) U.S. Cl. ............... 425/133.1; 425/380; 425/382.4; 425/462; 425/463; 425/464

(58) Field of Classification Search ............. 425/133.1, 425/382.4, 462, 463, 464, 380
See application file for complete search history.

(56) References Cited

U.S. PATENT DOCUMENTS

| | | | | |
|---|---|---|---|---|
| 3,491,406 A | * | 1/1970 | Davidson | .................... 425/466 |
| 3,809,515 A | * | 5/1974 | Farrell | ..................... 425/133.1 |
| 4,276,250 A | * | 6/1981 | Satchell et al. | ............. 264/167 |
| 6,616,437 B1 | * | 9/2003 | Neubauer | ................ 425/133.1 |
| 7,037,098 B2 | * | 5/2006 | Kossner et al. | .......... 425/133.1 |

FOREIGN PATENT DOCUMENTS

| | | | |
|---|---|---|---|
| DE | 29517378 | * | 4/1996 |
| WO | WO 00/07801 | * | 2/2000 |

* cited by examiner

*Primary Examiner*—Robert Davis
*Assistant Examiner*—Joseph Leyson

(57) ABSTRACT

Equipment (1) used in the molding or plastic pipe includes die tooling (3) provided with a plastic flow distributor (25) at the upper end of the die tooling. The plastic flow distributor has adjustable flow to provide an even distribution of plastic from an extruder into at least one die passage (9) within the die tooling.

15 Claims, 6 Drawing Sheets

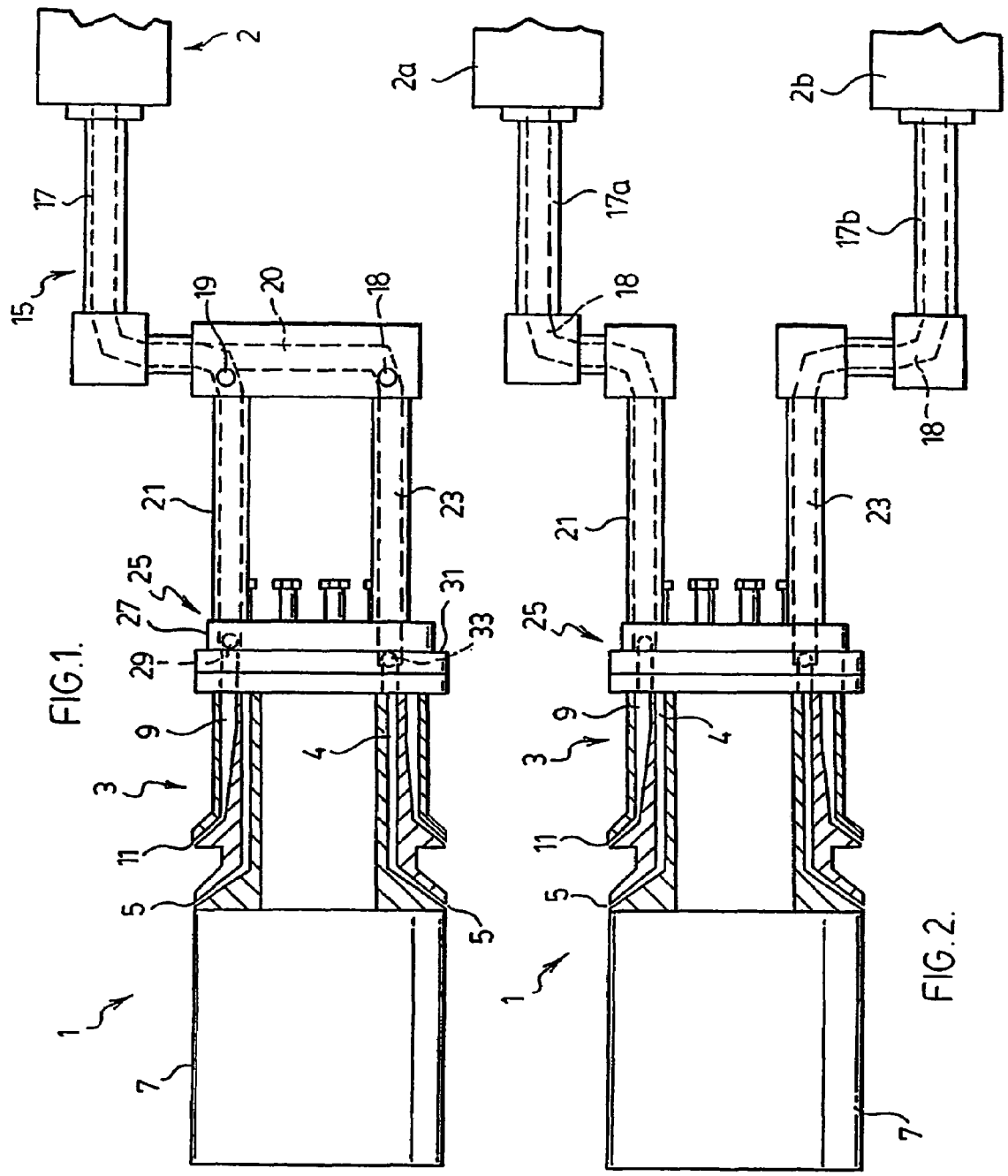

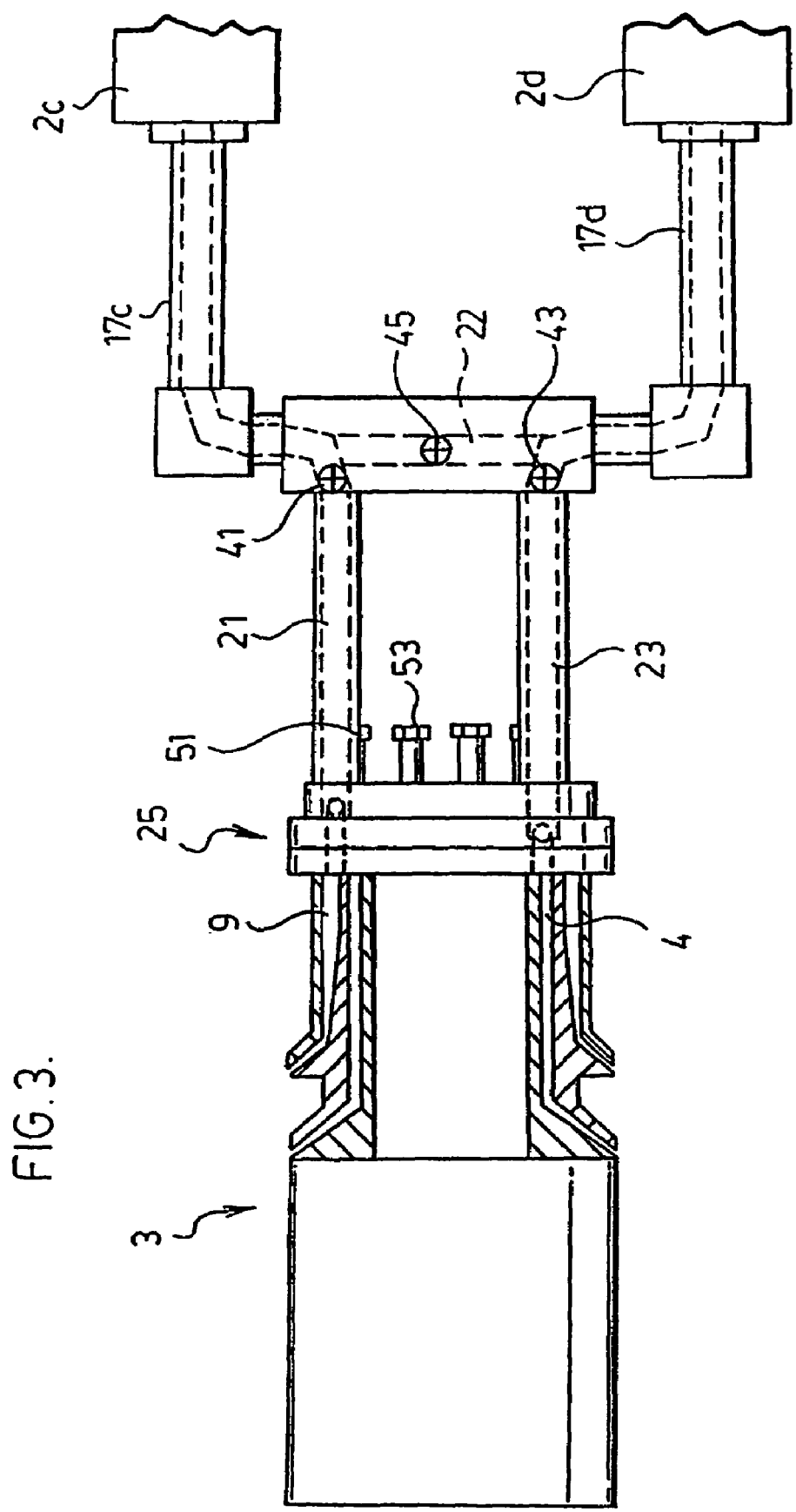

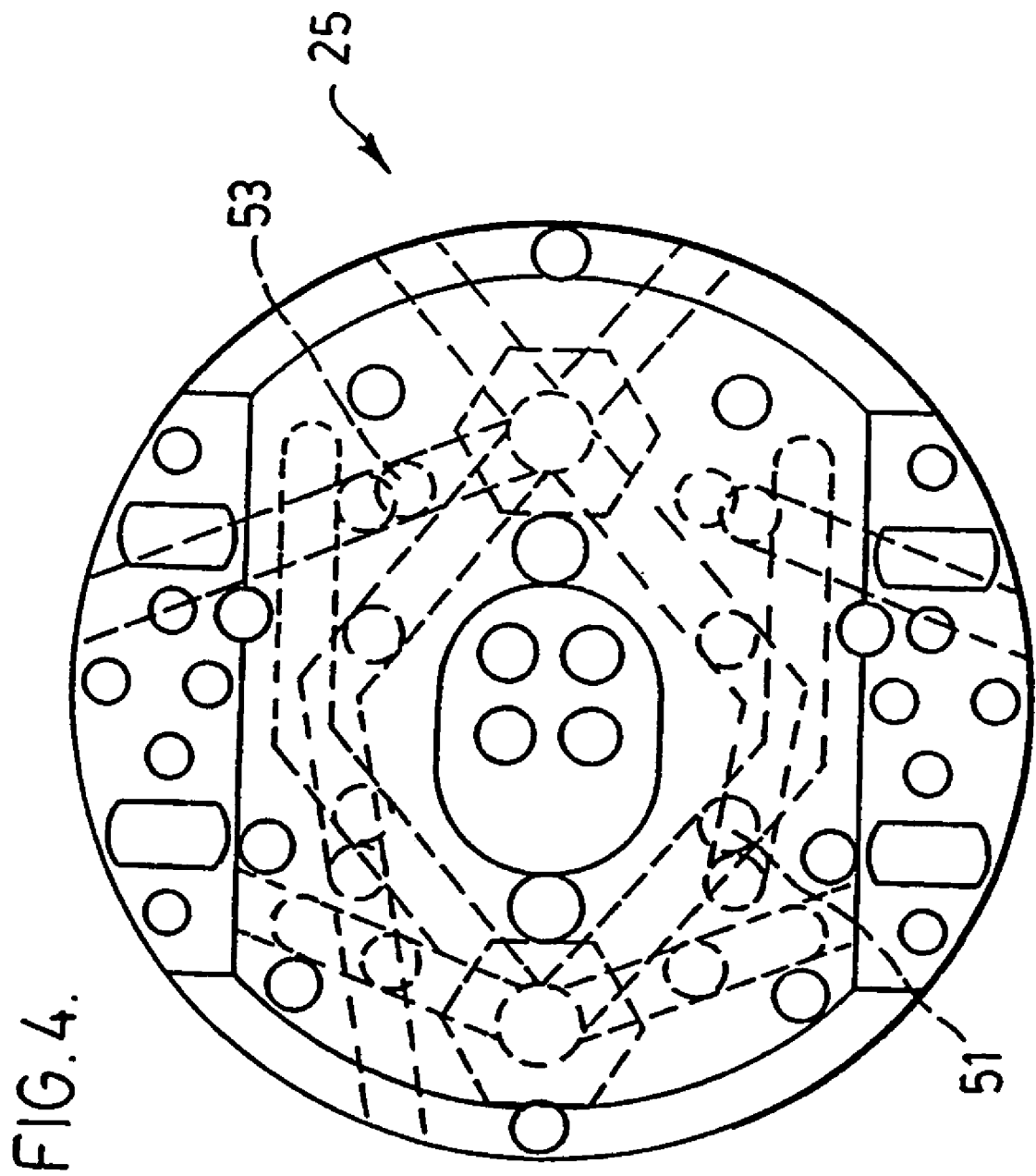

FLOW DISTRIBUTOR FOR DIE TOOLING OF PIPE MOLD EQUIPMENT WITH REMOTE EXTRUDER

FIELD OF THE INVENTION

The present invention relates to equipment including an extruder and die tooling used in the molding of plastic pipe.

BACKGROUND OF THE INVENTION

A traditional plastic pipe molding apparatus includes an extruder which feeds molten plastic directly to one or more interior passages of die tooling which leads to a molding region of the extruder. The one or more die passages can be used to make single or even ribbed pipe.

The above apparatus suffers from the drawback that the extruder and the die tooling are fixed in position relative to one another. This necessitates relative large die tool which is expensive and which takes a substantial amount of time to heat. Space saving and heating benefits can be achieved by locating the extruder at a location remote from the die tooling and then using a plastic feed from the extruder to the die tooling. However, according to known practice, these benefits are more than offset by the fact that with the current design i.e., the design of the extruder being fixed relative to the die tooling the extruder is able to feed directly into the die passage of the tooling. Accordingly, distribution of the plastic from the extruder around the mouth of the die passage is achieved in a relatively simple manner. The same is not true when working with a remotely located extruder which will not necessarily align directly with the mouth of the die passage. Accordingly, using existing technology it is very difficult to take advantage of the benefits provided when separating an extruder from die tooling equipment of a pipe molding apparatus because such separation makes it very difficult to produce an even distribution of molten plastic from the extruder into the die passage. Without such even distribution the resulting pipe is produced with inconsistencies in the wall or walls of the pipe.

SUMMARY OF THE PRESENT INVENTION

The present invention relates to equipment used in the molding of plastic pipe which takes advantage of the benefits achieved by separating an extruder from die tooling without suffering from the drawbacks of such a separation.

More particularly, the present invention relates to equipment used in the molding of a plastic pipe in which the equipment comprises a plastic supply providing molten plastic for making the pipe and die tooling which is located remotely of the plastic supply.

The die tooling has an internal die passage to carry the molten plastic to a molding region where the pipe is shaped. It further has an upstream end fitted with a flow distributor. The die passage has a ring shaped mouth covered by the flow distributor at the upstream end of the die tooling.

The equipment further includes a plastic feed from the plastic supply to the flow distributor. The flow distributor is then adjustable to produce an even distribution of the molten plastic which it receives from the plastic supply around the ring shaped mouth of the die passage.

According to an aspect of the invention the die tooling has multiple passages and the flow distributor has multiple outlets which are adjustable for each of the die passages.

According to another aspect of the invention the equipment uses a single extruder which feeds to the multiple flow outlets of the flow distributor. According to yet another aspect of the invention the equipment uses multiple extruders each of which feeds to an individual one of the flow outlets from the flow distributor.

According to still another aspect of the invention the equipment uses multiple extruders which can for example, be used to extrude different types of plastic materials. Each of the extruders feeds to each of the flow outlets from the flow distributor. In this aspect of the invention the equipment further includes valve means to selectively open and close each of the extruders to the flow distributor so that one can choose which one of the extruders is to be used in making the pipe.

BRIEF DESCRIPTION OF THE DRAWINGS

The above as well as other advantages and features of the present invention will be described in greater detail according to the preferred embodiments of the present invention in which;

FIGS. 1, 2 and 3 are all schematic views of equipment used in the molding of plastic pipe according to different embodiments of the present invention;

FIG. 4 is a front view of the plastic flow distributor used in any one of the embodiments of FIGS. 1, 2 and 3;

Figure 6:
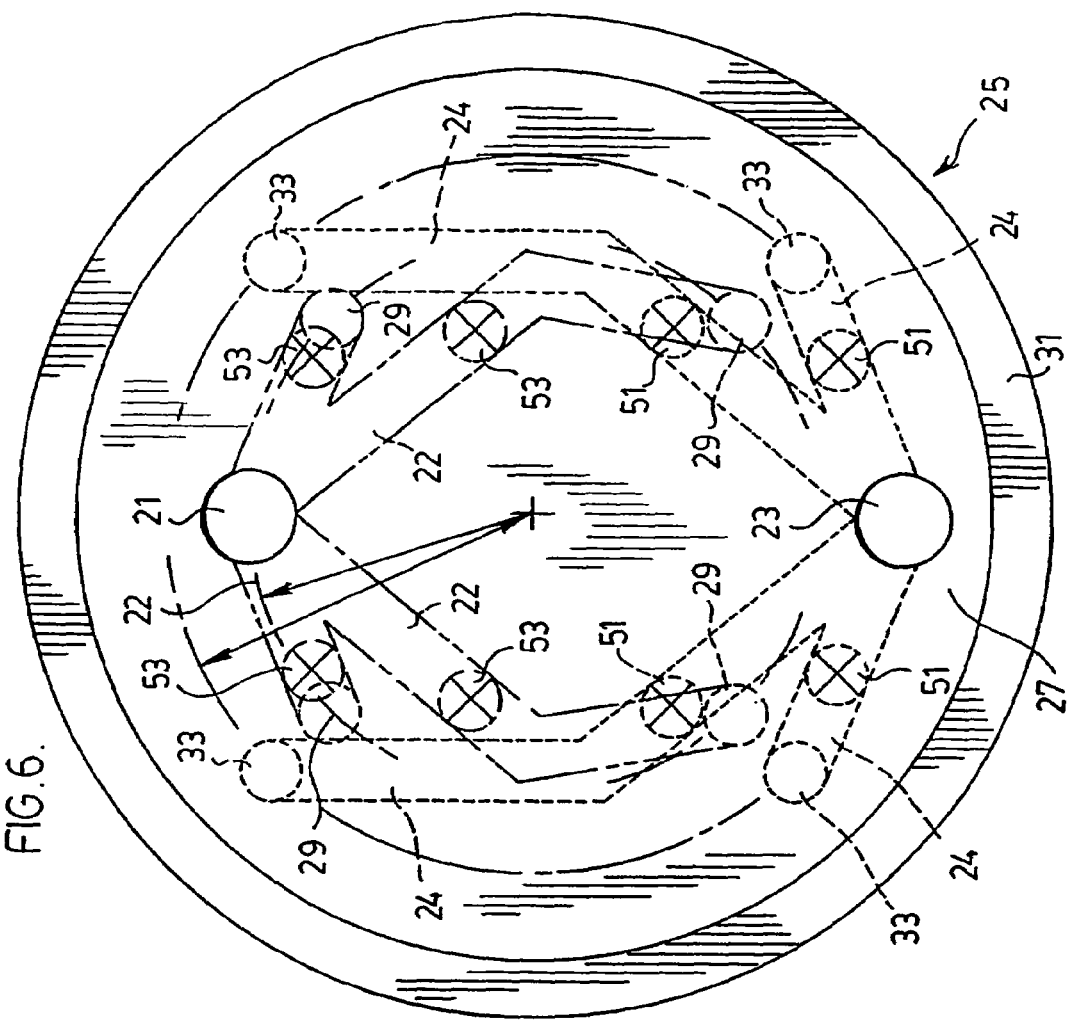
FIG. 6 is a sectional view through the flow distributor of FIG. 4 when looking from the rear of the flow distributor.

DETAILED DESCRIPTION ACCORDING TO THE PREFERRED EMBODIMENTS OF THE PRESENT INVENTION IN WHICH

FIG. 1 shows molding equipment generally indicated at 1 used in a pipe molding operation for forming plastic pipe. Equipment 1 comprises an extruder 2 which feeds to die tooling generally indicated at 3. This die tooling receives, as to be described later in detail, molten plastic from the extruder and delivers it to a mold region (not shown) in which the plastic pipe is formed. Typically this mold region is made up of a plurality of moving mold blocks having profiled faces for shaping the pipe. Located within the mold region is a cooling plug 7 against which the interior surface of the pipe is formed.

In the embodiment shown, die tooling 3 includes first and second die passages 4 and 9 respectively. Die passage 4 has a passage outlet 5 and die passage 9 has a passage outlet 11. These two passages which extend longitudinally of the die equipment have a ring like configuration with passage 9 being located outwardly around passage 4. Each of the passages has a ring shaped mouth at the upstream end of the die tooling 3 which is covered by a plastic flow distributor generally indicated at 25. This plastic flow distributor is in the form of a plate also to be described later in detail.

As can be seen in FIG. 1 of the drawings extruder 2 is located remotely of die tooling 3. This achieves a number of benefits. Firstly, the die tooling itself is substantially shorter in length than conventional die tooling using an onboard extruder, e.g. the die tooling is probably half the length or less of conventional die tooling. With this arrangement there are substantial savings with respect to the actual die tooling and furthermore the die tooling is much more easily and quickly heated than conventional die tooling.

In addition, the remote location of the extruder 2 relative to die tooling 3 does not require at a single location the large space necessitated by die tooling having an onboard extruder. In contrast, the die tooling itself can be placed in one location with relatively small space requirements and the extruder can be placed in another location.

According to the present invention a plastic feed generally indicated at 15 extends from extruder 2 to flow distributor 25. In order to do so the product feed comprises an individual conduit 17 feeding directly off of extruder 2. Conduit 17 eventually leads to branch feed lines 21 and 23 with a connecting branch between branches 21 and 23. A metering device generally indicated at 19 is provided at the mouth of branch 20 where this connecting extends from branch line 21 to branch line 23.

The plate construction of flow distributor 25 comprises a first plate portion 27 having outlets 29 which align with the mouth of die passage 9. Branch line 21 connects with the flow distributor so as to feed through the outlets 29 of plate portion 27 into die passage 9.

The plate construction of the flow distributor further includes plate portion 31 having outlets 33 which align with the mouth of die passage 4 at the upstream end of the die tooling. Branch line 23 connects with plate portion 31 so as to feed through flow distributor outlets 33 into die passage 4.

By way of example only, FIG. 4 shows the rear surface of flow distributor 25. Here it will be seen that the outlets from the two plate portions are not localized but rather are distributed around the mouths of the two die passages. This is highlighted by the solid line flow path markings of FIG. 4. Further features of the flow distributor will be later described with respect to FIGS. 5 through 9 of the drawings.

Returning to FIG. 1 the plastic from extruder 2 flows along conduit 17 as far as meter 19. This flow meter which is adjustable for flow distribution purposes will set the amount of molten plastic to flow along line 21 and along connecting line 20 to line 23. Line 21 feeding through flow distributor 25 is used to carry plastic to die passage 9 feeding into the mold tunnel through passage outlet 11 in forming part of the pipe wall while line 23 feeds plastic through the flow distributor into passage 4 and out outlet 5 in forming another part of the pipe wall.

FIG. 2 shows a further embodiment of the invention in which the equipment uses two extruders 2a and 2b rather than the single extruder shown in FIG. 1. This setup uses the same die tooling 3 and same flow distributor 25. It additionally uses the same branch or feed lines 21 and 23.

What differs between the FIG. 1 and FIG. 2 embodiments is that in FIG. 2, individual conduits 17a and 17b extend from the two extruders 2a and 2b. Conduits 17a feeds directly to branch line 21 which in turn feeds directly to die passage 9. Conduit 17b feeds directly to branch line 23 which then feeds to die passage 4. There is no connecting passage between the branches 21 and 23. Accordingly in this embodiment one part of the pipe wall is formed from the plastic of one of the extruders and another part of the pipe wall is formed from the plastic of the other extruder.

Another feature of the present invention which is used in both the embodiment of FIG. 1 and the embodiment of FIG. 2 is the provision of ball connectors 18 in each of the supply lines. These ball connectors, which regardless of the position in which they are set keep the plastic feed system in a closed condition allowing different positionings of the extruders relative to the die tooling.

FIG. 3 shows another embodiment of the invention once again using the same die tooling 3 fitted with a flow distributor 25 at the upstream end of the die tooling. The function and fitting of flow distributor 25 relative to the die tooling is identical to that described with respect to FIGS. 1 and 2 of the drawings.

In this particular embodiment the equipment includes extruders 2c and 2d. These extruders can be used to extrude different types of plastic materials to the die tooling. They may also be used for extruding the same type of material. Furthermore, they can be used simultaneously with one another or they can be used independently of one another.

It will be seen that extruder 2c feeds from a conduit 17c out of that particular extruder. Extruder 2d feeds from a conduit 17d. A valve 41 is located in conduit 17c and a valve 43 is located in conduit 17d.

Branch lines 21 and 23 feed to flow distributor 25 in the same manner as shown in FIGS. 1 and 2 of the drawings. A connecting branch 22 connects across the upstream ends of branches 21 and 23. A valve 45 is located in connecting branch 22.

By closing valve 45 in connecting branch 22 and by having valves 41 and 43 open the equipment of FIG. 3 operates in the same manner as the equipment shown in FIG. 2, i.e., conduit 41 feeds along branch 21 to the flow distributor. Conduit 43 feeds along branch 23 to the flow distributor. No plastic is allowed to flow across connecting branch 22. Accordingly, the plastic from extruder 2c is used to make the part of the pipe wall emanating from die passage 9 while extruder 2d is used to make the part of the pipe wall emanating from die passage 4.

In order to make the pipe entirely from the plastic of extruder 2c valves 41 and 45 are opened. Valve 43 is closed. In this configuration the plastic will flow along conduit 17c past valve 41 and down branch line 21. The plastic will additionally flow along branch line 22 past valve 45 and down branch line 23. The plastic cannot flow past the closed valve 43.

If it is desired to make the pipe entirely from the plastic of extruder 2d valves 43 and 22 are opened and valve 41 is closed. Under these conditions the plastic from extruder 2d flows along conduit 17d past valve 43 and down branch line 21. The plastic additionally flows along branch line 22 where it is diverted by the closed valve 41 into branch line 21.

It will be seen from the description above that even though much of the setup for each of the individual embodiments is consistent from one embodiment to another the equipment itself is extremely adaptive to use a single extruder, multiple extruders and multiple extruders extruding different types of plastic materials. In each of these embodiments the die tooling is the same as is the flow distributor used at the upstream end of the die tooling.

One of the key features to the present invention lies in the fact that the flow distributor and in particular the two plate portions 27 and 31 are adjustable at different locations around each of the plate portions for the most efficient flow of plastic to the die tooling. In FIGS. 3 and 4 of the drawings it will be seen that the flow distributor 25 includes numerous different adjustment members 51 and 53 which can either be tightened or loosened to adjust the flow to the outlets of the two plate portions relative to the die passage mouths. Note that the adjustments of the plate portions are done independently of one another.

For example, the flow of plastic to the flow distributor from each of the extruders will be strongest at the localized location where the plastic enters the flow distributor. However, the plastic must be evenly distributed or spread completely around the ring like mouth of each of the die passages. Therefore the adjustment means must be setup to decrease the plastic flow at or near the location where the plastic enters the flow distributor and to cause the plastic to flow more evenly to the weaker flow areas at the passage mouth farther away from the source of plastic. The provision of multiple adjustment points around the periphery of the two plate portions of the flow distributor enables the required adjustments at each of the plate portions so as to provide consistent wall thickness around the pipe produced using the equipment.

Figure 5:
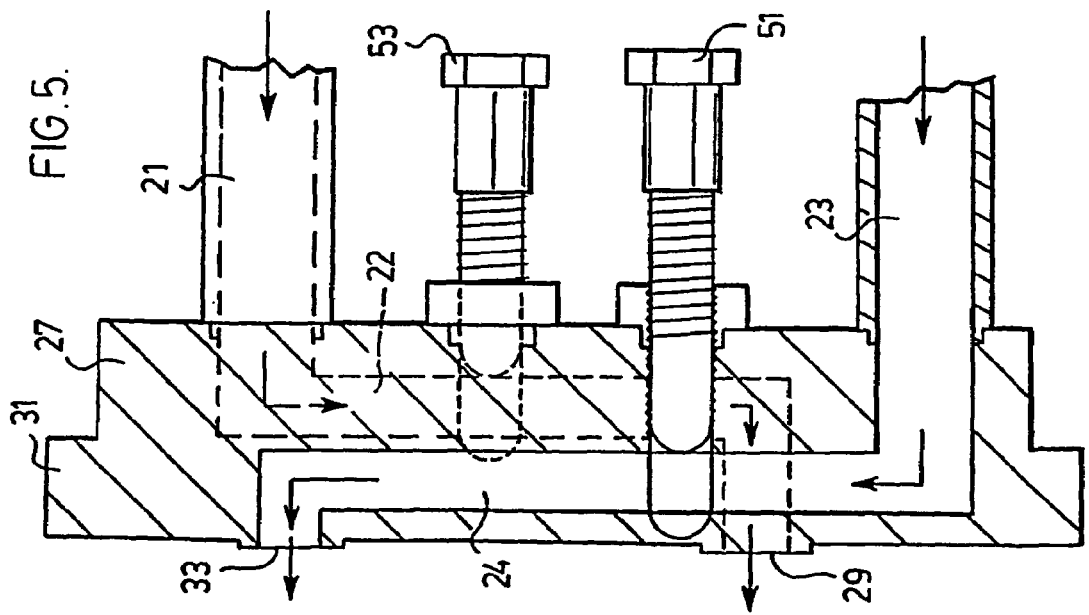
FIG. 5 is a cross sectional view of the flow distributor of FIG. 4 looking through the side of the flow distributor.
Figure 7:
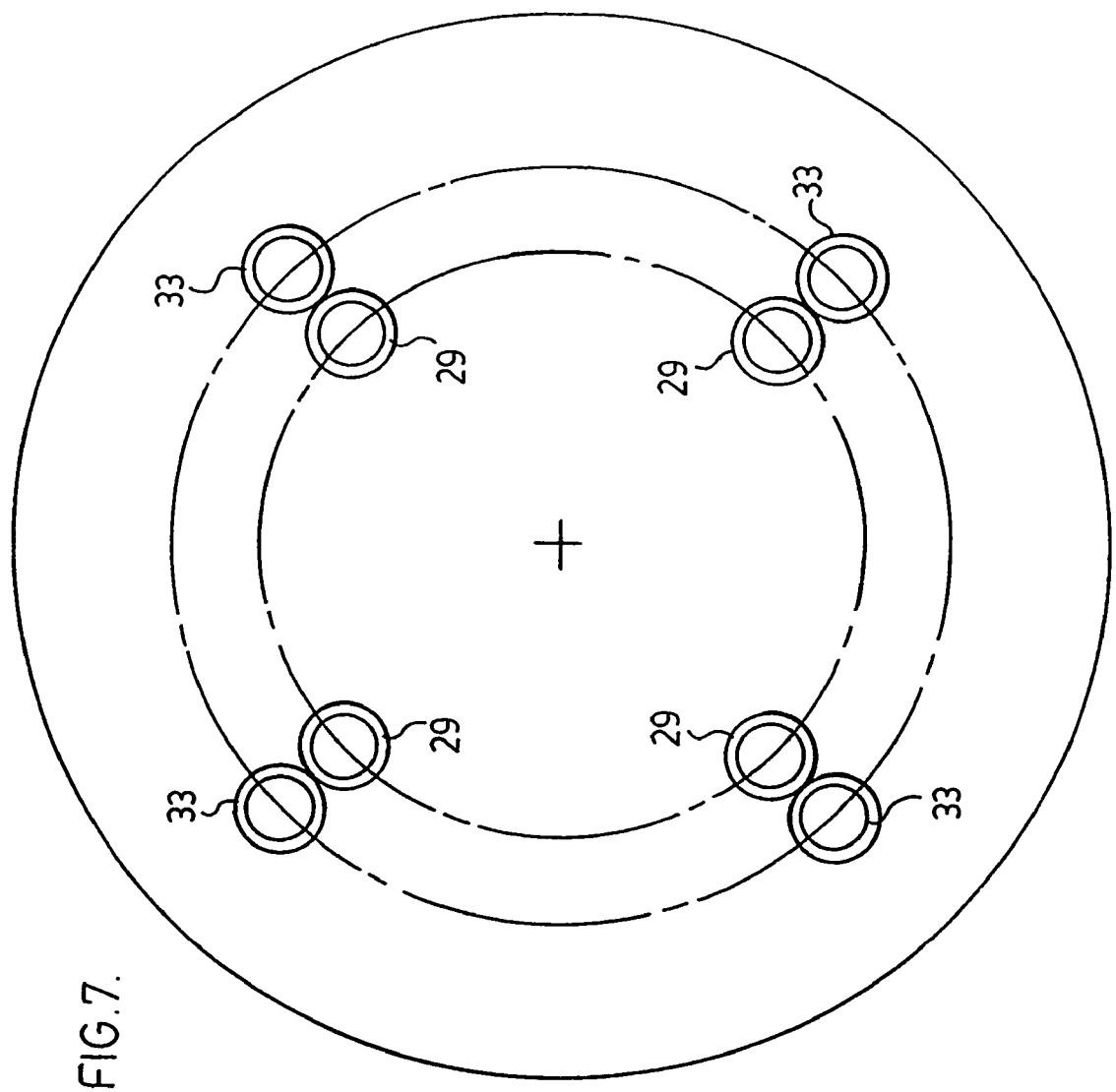
FIG. 7 is a front view of the flow distributor of FIG. 4.

More specific details with respect to the flow distributor are shown in FIGS. 5 through 9 of the drawings. For example, FIG. 5 clearly shows that the two plate portions 27 and 31 of the flow distributor are integral with one another. Branch line 21 feeds through plate portion 27 along passages 22 which outlet at the openings 29 to the upstream side of the distributor plate. As can be seen in FIG. 5 these passages penetrate through both the plate portion 27 and the plate portion 31. Adjustment screws 53 are used to open and close passages 22 to control plastic flow distribution to the inner pipe wall through plate outlet openings 29.

Plastic flow branch 23 feeds through passages 24 directly into plate portion 31 bypassing plate portion 27. Passages 24 outlet at openings 33 which feed the plastic for the formation of the outer pipe wall. Adjustment screws 51 are provided in the flow passages 24 to adjust plastic distribution around the distributor for the outer pipe wall. Note that even though adjustment members 51 penetrate through pipe portion 27 to plate portion 31 the adjustment of these members does not affect the flow of plastic through passages 22.

Figure 9:
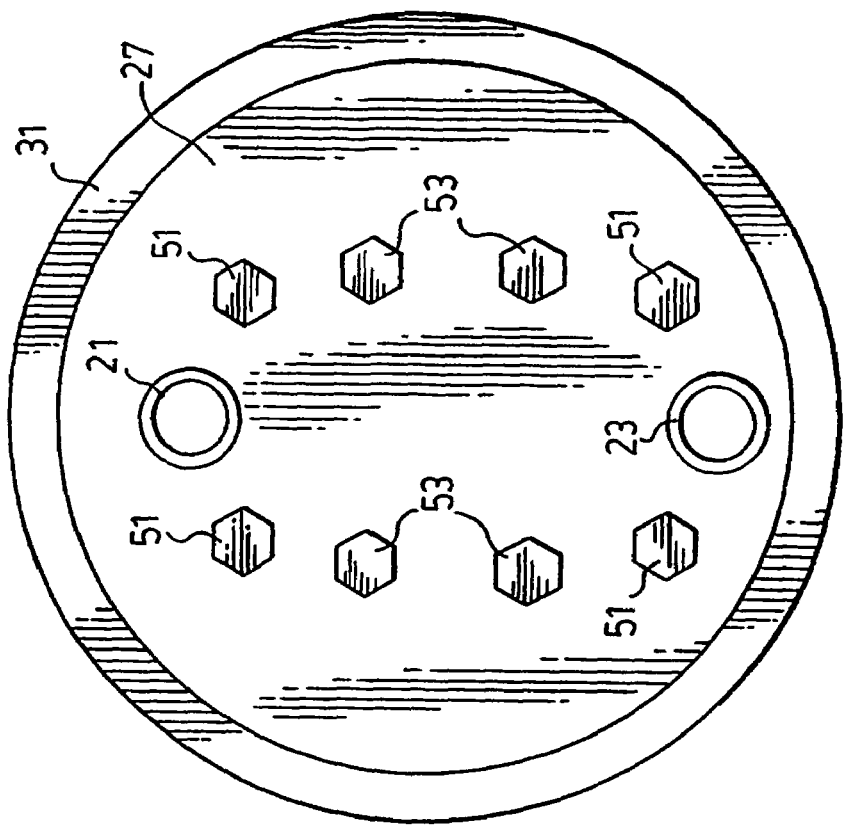
FIGS. 8 and 9 are side and rear views respectively of the flow distributor of FIG. 4.
Figure 8:
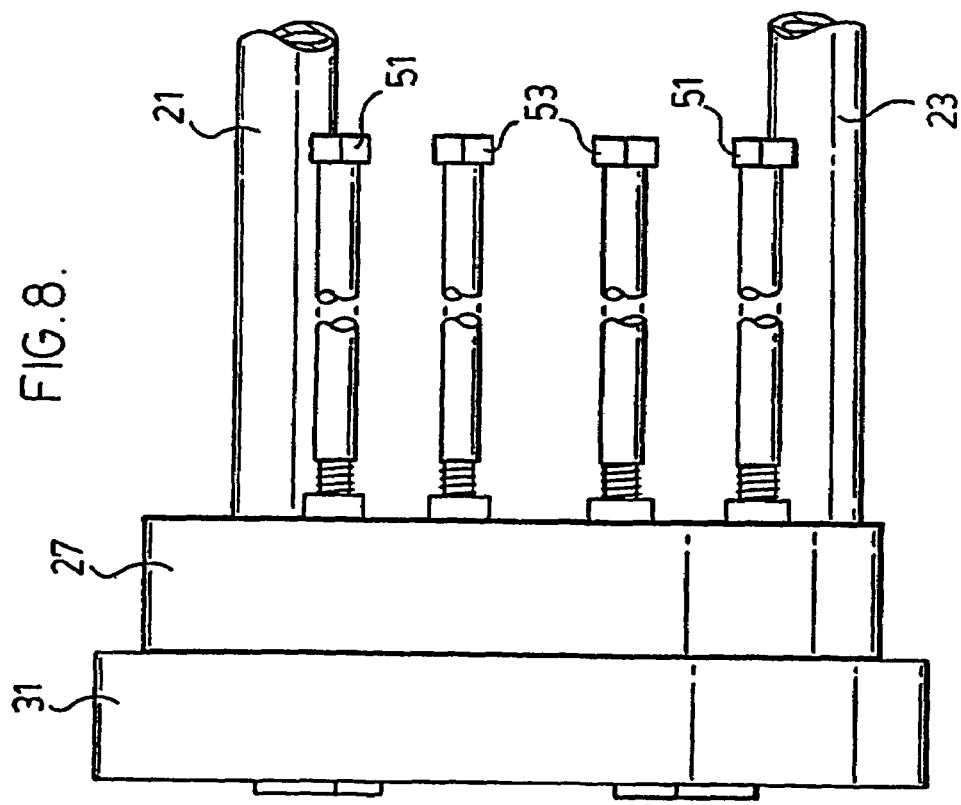

FIGS. 8 and 9 show that the adjustment members 51 and 53 are easily accessible from the rear of the flow distributor plate.

Although various preferred embodiments of the present invention have been described in detail, it will be appreciated by those skilled in the art that variations may be made without departing from the spirit of the invention or the scope of the appended claims.

The invention claimed is:

1. Equipment used in the molding of plastic pipe, said equipment comprising a plastic supply and plastic feed that provide molten plastic for making the pipe to a flow distributor connected to an upstream end of die tooling, said plastic supply being located remotely of the die tooling, said die tooling having a first internal elongate die passage of a ring shaped cross section to carry the molten plastic to a downstream molding region where the pipe is shaped, the die passage having a ring shaped mouth covered by the flow distributor; the flow distributor having a first plastic flow path having an inlet connected to said plastic feed and at least two channels connected to said inlet with each channel having an outlet port feeding molten plastic to said ring shaped mouth of said first internal die passage with said outlets ports being distributed about said ring shaped mouth; said equipment further including a first adjustment means associated with said at least two channels to manually vary the distribution of molten plastic from the plastic supply through the outlet ports positioned around the ring shaped month of the first internal die passage to produce an even distribution of the molten plastic from the elongate die passage at the downstream molding region; and wherein said first adjustment means being positioned upstream of and spaced from said outlet ports.

2. Equipment as claimed in claim 1 wherein said die tooling includes a second elongate die passage having a ring shaped month which is outwardly around the mouth of the first die passage and which is also covered by the flow distributor, the flow distributor having a second plastic flow path having an inlet connected to said plastic supply to receive molten plastic and at least two channels connected to said inlet with each channel having an outlet port feeding molten plastic to said ring shaped mouth of said second elongate die passage with said outlet port being distributed about said ring shaped mouth of said second elongate die passage; said equipment further including a second adjustment means associated with said at least two channels of said second plastic flow path to manually vary the distribution of molten plastic from the plastic supply through said outlet port positioned around the mouth of the second die passage to produce an even distribution of the molten plastic from the second die passage at the downstream molding region.

3. Equipment as claimed in claim 2 wherein said flow distributor comprises a plate secured to the upstream end of said die tooling, said plate including a first plate portion which feeds through the first plastic flow path to the mouth of the first die passage and a second plate portion which feeds second plastic flow path to the mouth of said second die passage, said first and second adjustment means being adjustable independently of one another.

4. Equipment as claimed in claim 2 wherein said plastic supply comprise a single extruder and wherein said plastic feed comprises a single conduit from said extruder to first and second supply branches of said plastic supply, said first supply branch feeding to the first plastic flow path of the flow distributor around the mouth of the first die passage, the second supply branch feeding to the second plastic flow path of the flow distributor around the mouth of the second die passage.

5. Equipment as claimed in claim 2 wherein said plastic supply comprises first and second extruders, said plastic feed comprising a first conduit from said first extruder to the first plastic flow path of said flow distributor around the mouth of said first die passage and a second conduit from said second extruder to the second plastic flow path of said flow distributor around the mouth of said second die passage.

6. Equipment as claimed in claim 2 wherein said plastic supply comprises first and second extruders, said plastic feed comprising a first conduit from said first extruder and a second conduit from said second extruder, a first supply branch feeding to the first plastic flow path of the flow distributor around the mouth of the first die passage, a second supply branch feeding to the second plastic flow path around the mouth of the second die passage, and a connecting branch between said first and second supply branches, both said first and said second conduits from said first and second extruders feeding to said connecting branch of said plastic feed and said plastic supply including flow adjustment means for selecting opening and closing said first and second conduits relative to said connecting branch.

7. Equipment as claimed in claim 1 wherein said at least two channels is at least four channels.

8. Equipment as claimed in claim 1 wherein said first adjustment means includes a manually adjustable valve associated with each channel.

9. Equipment as claimed in claim 8 wherein said at least two channels is at least four channels.

10. Equipment as claimed in claim 9 wherein each valve is adjustable at an exposed upstream face of said flow distributor.

11. Equipment as claimed in claim 2 wherein said at least two channels of said first flow path is at least four channels and said at least two channels of said second flow path is at least four channels.

12. Equipment as claimed in claim 2 wherein said first adjustment means and said second adjustment means each include a manually adjustable valve associated with each respective channel.

13. Equipment as claimed in claim 12 wherein each valve is adjustable at an exposed upstream face of said flow distributor.

14. Equipment as claimed in claim 13 wherein each valve is an adjustable threaded member movable to different positions partially blocking the respective channel.

15. Equipment as claimed in claim 14 wherein said flow distributor is a plate that extends across said first internal die passage of said die tooling.

* * * * *